US012596449B1

(12) United States Patent
Lin et al.

(10) Patent No.: US 12,596,449 B1
(45) Date of Patent: Apr. 7, 2026

(54) TOUCH DRIVING CIRCUIT

(71) Applicant: HIMAX TECHNOLOGIES LIMITED, Tainan City (TW)

(72) Inventors: Ling-Chi Lin, Tainan City (TW);
Yaw-Guang Chang, Tainan City (TW);
Jia-Ming He, Tainan City (TW);
Zong-You Hou, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 19/023,135

(22) Filed: Jan. 15, 2025

(51) Int. Cl.
*G06F 3/041* (2006.01)
(52) U.S. Cl.
CPC .................................. *G06F 3/0416* (2013.01)
(58) Field of Classification Search
None
See application file for complete search history.

(56) References Cited

U.S. PATENT DOCUMENTS

2022/0197321 A1* 6/2022 Tiagaraj ................... G05F 1/565
2024/0265838 A1* 8/2024 Min ........................ G09G 3/006

* cited by examiner

*Primary Examiner* — Stephen T. Reed
(74) *Attorney, Agent, or Firm* — JCIPRNET

(57) ABSTRACT

A touch driving circuit is provided. The touch driving circuit includes a charge pump, a plurality of regulators, a plurality of digital to analog converters and a switch circuit. The charge pump is configured to output a plurality of currents. The plurality of regulators is coupled to the charge pump, and configured to output a plurality of charging voltages according to the plurality of currents. The plurality of digital to analog converters is coupled to the plurality of regulators, and configured to output a plurality of driving voltages according to the plurality of charging voltages. The switch circuit is coupled to the plurality of digital to analog converters and a touch panel, and configured to output the plurality of driving voltages in a time-sharing manner to form a driving signal for the touch panel.

16 Claims, 9 Drawing Sheets

TOUCH DRIVING CIRCUIT

BACKGROUND

Technical Field

The disclosure relates to a circuit, and particularly relates to a touch driving circuit.

Description of Related Art

As the electronic product with touch and display functions become thinner and lighter, the distance between the touch panel and display panel is getting closer and closer, resulting in increased noise interference. In this regard, the touch drive circuit needs to implement a high-voltage drive function, which will also cause higher power consumption.

SUMMARY

The disclosure is directed to a touch driving circuit, which is adapted to achieve high-voltage drive effects with lower power consumption.

The touch driving circuit of the disclosure includes a charge pump, a plurality of regulators, a plurality of digital to analog converters and a switch circuit. The charge pump is configured to output a plurality of currents. The plurality of regulators is coupled to the charge pump, and configured to output a plurality of charging voltages according to the plurality of currents. The plurality of digital to analog converters is coupled to the plurality of regulators, and configured to output a plurality of driving voltages according to the plurality of charging voltages. The switch circuit is coupled to the plurality of digital to analog converters and a touch panel, and configured to output the plurality of driving voltages in a time-sharing manner to form a driving signal for the touch panel.

Based on the above, the touch driving circuit of the disclosure may achieve high-voltage driving effects through multi-stage charging.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
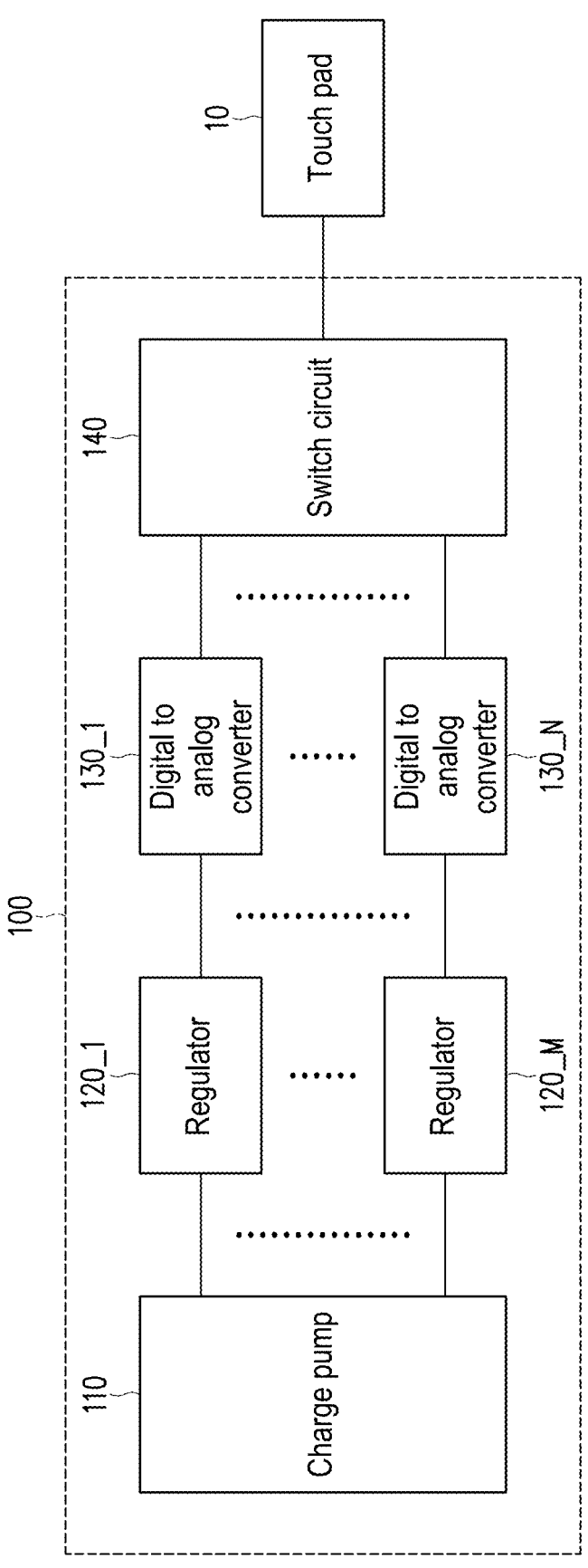
FIG. 1 is a schematic diagram of a touch driving circuit according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ."

The term "coupling (or electrically connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device.

FIG. 1 is a schematic diagram of a touch driving circuit according to an embodiment of the disclosure. Referring to FIG. 1, the touch driving circuit 100 includes a charge pump (circuit) 110, a plurality of regulators 120_1 to 120_M, a plurality of digital to analog converters (DACs) 130_1 to 130_N and a switch circuit 140, where M and N are positive integers. The regulators 120_1 to 120_M are coupled to the charge pump 110 and the DACs 130_1 to 130_N. The DACs 130_1 to 130_N are further coupled to the switch circuit 140. The switch circuit 140 is further coupled to the touch panel 10.

In the embodiment of the disclosure, the charge pump 110 is configured to output a plurality of currents to the regulators 120_1 to 120_M. The regulators 120_1 to 120_M are configured to output a plurality of charging voltages to the DACs 130_1 to 130_N according to the currents. The DACs 130_1 to 130_N is configured to convert the charging voltages to output a plurality of driving voltages to the switch circuit 140. The switch circuit 140 is configured to output the driving voltages in a time-sharing manner to form a driving signal 101 for driving the touch panel 10. The switch circuit 140 generates the driving signal 101 through multi-stage charging.

In the embodiment of the disclosure, the regulators 120_1 to 120_M may be a plurality of low-dropout regulators (LDOs). In the embodiment of the disclosure, the touch panel 10 may be integrated with a display panel, and the display panel may be an active-matrix organic light-emitting diode (AMOLED) display panel, but the disclosure is not limited thereto. In the embodiment of the disclosure, the touch panel 10 may include a plurality of touch pads. The touch driving circuit 100 may drive at least one of the touch pads of the touch panel 10 by the driving signal 101.

Figure 2:
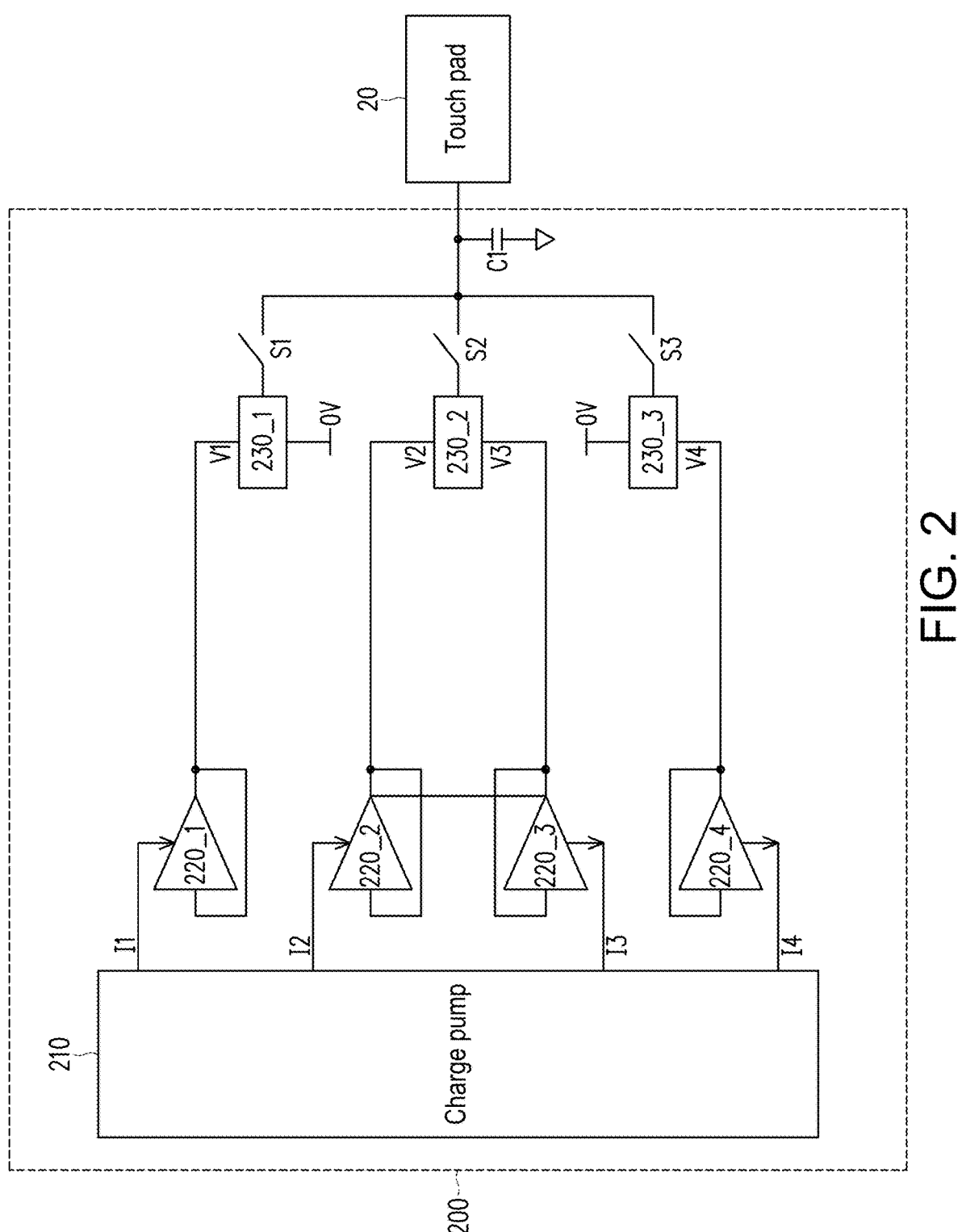
FIG. 2 is a schematic diagram of a touch driving circuit according to an embodiment of the disclosure.

FIG. 2 is a schematic diagram of a touch driving circuit according to an embodiment of the disclosure. Referring to FIG. 2, the touch driving circuit 200 includes a charge pump 210, a plurality of regulators 220_1 to 220_4, a plurality of DACs 230_1 to 230_3, a switch circuit 240 and a capacitor C1. The switch circuit 240 includes a plurality of switches S1 to S3. The switch S1 is coupled between the digital to an output terminal of the analog converter 230_1 and the touch panel 20. The switch S2 is coupled between an output terminal of the DAC 230_2 and the touch panel 20. The switch S3 is coupled between an output terminal of the DAC 230_3 and the touch panel 20.

In the embodiment of the disclosure, a power input terminal of the regulator 220_1 is coupled to the charge pump 210, and receives a charging current I1 from the charge pump 210. An input terminal of the regulator 220_1 is coupled to an output terminal of the regulator 220_1. The output terminal of the regulator 220_1 generates a charging voltage V1 according to the charging current I1, and provides the charging voltage V1 to the DAC 230_1. The DAC 230_1 receives the charging voltage V1, and is operated between the charging voltage V1 and a ground voltage (0V). The DAC 230_1 outputs a first driving voltage to a first terminal of the switch S1 by converting the charging voltage V1 or the ground voltage (0V).

In the embodiment of the disclosure, a power input terminal of the regulator 220_2 is coupled to the charge pump 210, and receives a charging current I2 from the charge pump 210. An input terminal of the regulator 220_2 is coupled to an output terminal of the regulator 220_2. The output terminal of the regulator 220_2 generates a charging voltage V2 according to the charging current I2, and provides the charging voltage V2 to the DAC 230_2.

In the embodiment of the disclosure, a power input terminal of the regulator 220_3 is coupled to the charge pump 210, and receives a discharging current I3 from the charge pump 210. An input terminal of the regulator 220_3 is coupled to an output terminal of the regulator 220_3. The output terminal of the regulator 220_3 generates a charging voltage V3 according to the discharging current I3, and provides the charging voltage V3 to the DAC 230_3.

The DAC 230_2 receives the charging voltages V2 and V3, and is operated between the charging voltage V2 and the charging voltage V3. The DAC 230_2 outputs a second driving voltage to a first terminal of the switch S2 by converting the charging voltage V2 or the charging voltage V3.

In the embodiment of the disclosure, a power input terminal of the regulator 220_4 is coupled to the charge pump 210, and receives a discharging current I4 from the charge pump 210. An input terminal of the regulator 220_4 is coupled to an output terminal of the regulator 220_4. The output terminal of the regulator 220_4 generates a charging voltage V4 according to the discharging current I4, and provides the charging voltage V4 to the DAC 230_3. The DAC 230_3 receives the charging voltage V4, and is operated between the charging voltage V4 and the ground voltage (0V). The DAC 230_3 outputs a third driving voltage to a first terminal of the switch S3 by converting the charging voltage V1 or the ground voltage (0V).

In the embodiment of the disclosure, the charging voltages V1 to V4 have different voltage levels. The second terminals of the switches S1 to S3 are coupled to a first terminal of the capacitor C1 and the touch panel 20. A second terminal of the capacitor C1 is coupled to the ground voltage (0V). In the embodiment of the disclosure, the switches S1 to S3 are selectively switched to provide multi-stage charging voltages to charge the capacitor C1, and the capacitor C1 outputs the corresponding driving voltages to form a driving signal 201 to the touch panel 20.

Figure 3:
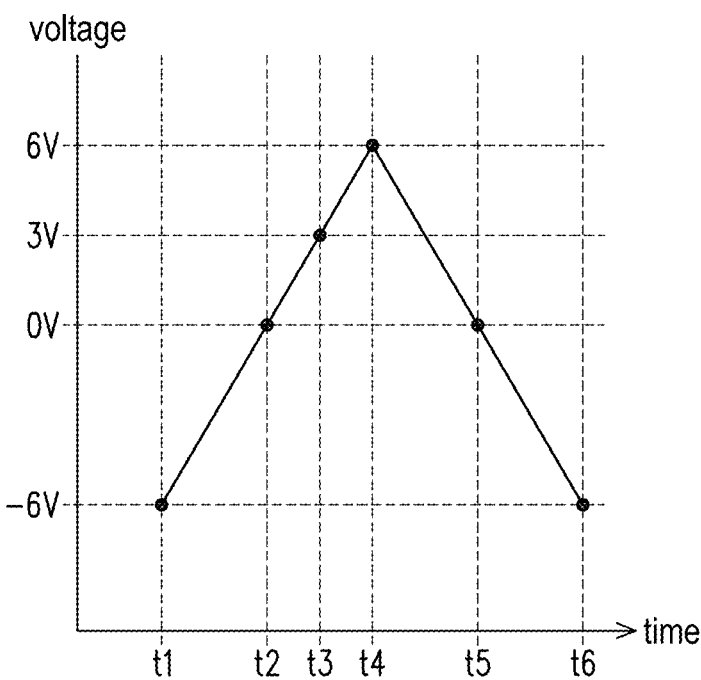
FIG. 3 is a waveform diagram of a driving signal according to an embodiment of the disclosure.

FIG. 3 is a waveform diagram of a driving signal according to an embodiment of the disclosure Referring to FIG. 2 and FIG. 3, in one embodiment of the disclosure, the touch driving circuit 200 may generate the driving signal 201 from +6 volts (V) to −6 volts. The charge pump 210 may provide a voltage of +3.3 volts corresponding to a plurality of charge currents or a discharge currents to the regulators 220_1 to 220_4. That is, if the charging voltage V1 is +6 volts, the charge pump 210 need output double the current to the regulator 220_1. For example, the charging current I1 may be equal to 2×I, where symbol I represents a fixed ampere of current outputted from the charge pump 210. If the charging voltage V2 is +3 volts, the charge pump 210 need output the current to the regulator 220_2. For example, the charging current I2 may be equal to I. If the charging voltage V3 is −3 volts, the charge pump 210 need draw the current from the regulator 220_3. For example, the discharging current I3 may be equal to I. If the charging voltage V4 is −6 volts, the charge pump 210 need draw the current from the regulator 220_4. For example, the discharging current I4 may be equal to 2×I.

As shown in FIG. 3, in one embodiment of the disclosure, the touch driving circuit 200 may firstly rising the driving signal 201 from −6 volts to 0 volts. During a period from time t1 to time t2, the switch S3 may be turned-on, and the DAC 230_3 may provide the voltage of 0 volt to the capacitor C1 through the switch S3, so that the driving signal 201 may be raised from −6 volts to 0 volts. In this regard, the power consumption of the charge pump 210 may be 0 during the period from time t1 to time t2 because the charge pump 210 does not need to provide the power.

Then, the touch driving circuit 200 may rise the driving signal 201 from 0 volts to +3 volts. During a period from time t2 to time t3, the switch S2 may be turned-on, and the DAC 230_2 may provide the voltage of +3 volt to the capacitor C1 through the switch S2, so that the driving signal 201 may be raised from 0 volts to +3 volts. In this regard, the power consumption of the charge pump 210 may be equal to 3×I×C during the period from time t2 to time t3, where symbol C represents a capacitance value of the capacitor C1 (i.e. charging single pump current). Then, the touch driving circuit 200 may rise the driving signal 201 from +3 volts to +6 volts. During a period from time t3 to time t4, the switch S1 may be turned-on, and the DAC 230_1 may provide the voltage of +6 volt to the capacitor C1 through the switch S1, so that the driving signal 201 may be raised from +3 volts to +6 volts. In this regard, the power consumption of the charge pump 210 may be equal to 3×2×I×C during the period from time t3 to time t4 (i.e. charging double pump current).

Then, the touch driving circuit 200 may reduce the driving signal 201 from +6 volts to 0 volts. During a period from time t4 to time t5, the switch S1 may be turned-on, and the DAC 230_1 may provide the voltage of 0 volt to the capacitor C1 through the switch S1, so that the driving signal 201 may be reduced from +6 volts to 0 volts. In this regard, the power consumption of the charge pump 210 may be equal to 0 during the period from time t4 to time t5 because the charge pump 210 does not need to provide the power.

Then, the touch driving circuit 200 may reduce the driving signal 201 from 0 volts to −6 volts. During a period from time t5 to time t6, the switch S3 may be turned-on, and the DAC 230_3 may provide the voltage of −6 volt to the capacitor C1 through the switch S3, so that the driving signal 201 may be reduced from 0 volts to −6 volts. In this regard, the power consumption of the charge pump 210 may be equal to 6×2×I×C during the period from time t5 to time t6 (i.e. discharge double pump current).

Therefore, the touch driving circuit 200 of the embodiment may achieve an effective high voltage charging function between −6 volts to +6 volts and the power consumption may be approximately 21×I×C (i.e. (0+3+6+0+12)×I×C).

Figure 4:
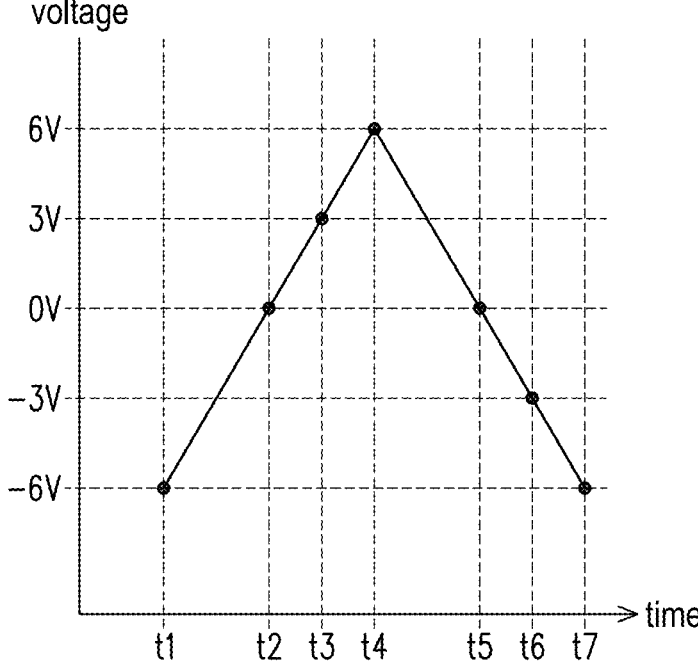
FIG. 4 is a waveform diagram of a driving signal according to an embodiment of the disclosure.

FIG. 4 is a waveform diagram of a driving signal according to an embodiment of the disclosure. Referring to FIG. 2 and FIG. 4, in another embodiment of the disclosure, the touch driving circuit 200 may firstly rising the driving signal 201 from −6 volts to 0 volts. During a period from time t1 to time t2, the switch S3 may be turned-on, and the DAC 230_3 may provide the voltage of 0 volt to the capacitor C1 through the switch S3, so that the driving signal 201 may be raised from −6 volts to 0 volts. In this regard, the power consumption of the charge pump 210 may be 0 during the period from time t1 to time t2 because the charge pump 210 does not need to provide the power.

Then, the touch driving circuit 200 may rise the driving signal 201 from 0 volts to +3 volts. During a period from time t2 to time t3, the switch S2 may be turned-on, and the DAC 230_2 may provide the voltage of +3 volt to the capacitor C1 through the switch S2, so that the driving signal 201 may be raised from 0 volts to +3 volts. In this regard, the power consumption of the charge pump 210 may be equal to 3×I×C during the period from time t2 to time t3, where symbol C represents a capacitance value of the capacitor C1 (i.e. charging single pump current).

Then, the touch driving circuit 200 may rise the driving signal 201 from +3 volts to +6 volts. During a period from time t3 to time t4, the switch S1 may be turned-on, and the DAC 230_1 may provide the voltage of +6 volt to the capacitor C1 through the switch S1, so that the driving signal 201 may be raised from +3 volts to +6 volts. In this regard, the power consumption of the charge pump 210 may be equal to 3×2×I×C during the period from time t3 to time t4 (i.e. charging double pump current).

Then, the touch driving circuit 200 may reduce the driving signal 201 from +6 volts to 0 volts. During a period from time t4 to time t5, the switch S1 may be turned-on, and the DAC 230_1 may provide the voltage of 0 volt to the capacitor C1 through the switch S1, so that the driving signal 201 may be reduced from +6 volts to 0 volts. In this regard, the power consumption of the charge pump 210 may be equal to 0 during the period from time t4 to time t5 because the charge pump 210 does not need to provide the power.

Then, the touch driving circuit 200 may reduce the driving signal 201 from 0 volts to −3 volts. During a period from time t5 to time t6, the switch S2 may be turned-on, and the DAC 230_2 may provide the voltage of −3 volt to the capacitor C1 through the switch S2, so that the driving signal 201 may be reduced from 0 volts to −3 volts. In this regard, the power consumption of the charge pump 210 may be equal to 3×I×C during the period from time t5 to time t6 (i.e. discharge single pump current).

Then, the touch driving circuit 200 may reduce the driving signal 201 from −3 volts to −6 volts. During a period from time t6 to time t7, the switch S3 may be turned-on, and the DAC 230_3 may provide the voltage of −6 volt to the capacitor C1 through the switch S3, so that the driving signal 201 may be reduced from −3 volts to −6 volts. In this regard, the power consumption of the charge pump 210 may be equal to 3×2×I×C during the period from time t5 to time t6 (i.e. discharge double pump current).

Therefore, the touch driving circuit 200 of the embodiment may achieve an effective high voltage charging function between −6 volts to +6 volts and the power consumption may be approximately 18×I×C (i.e. =(0+3+6+0+3+6)×I×C).

Figure 5:
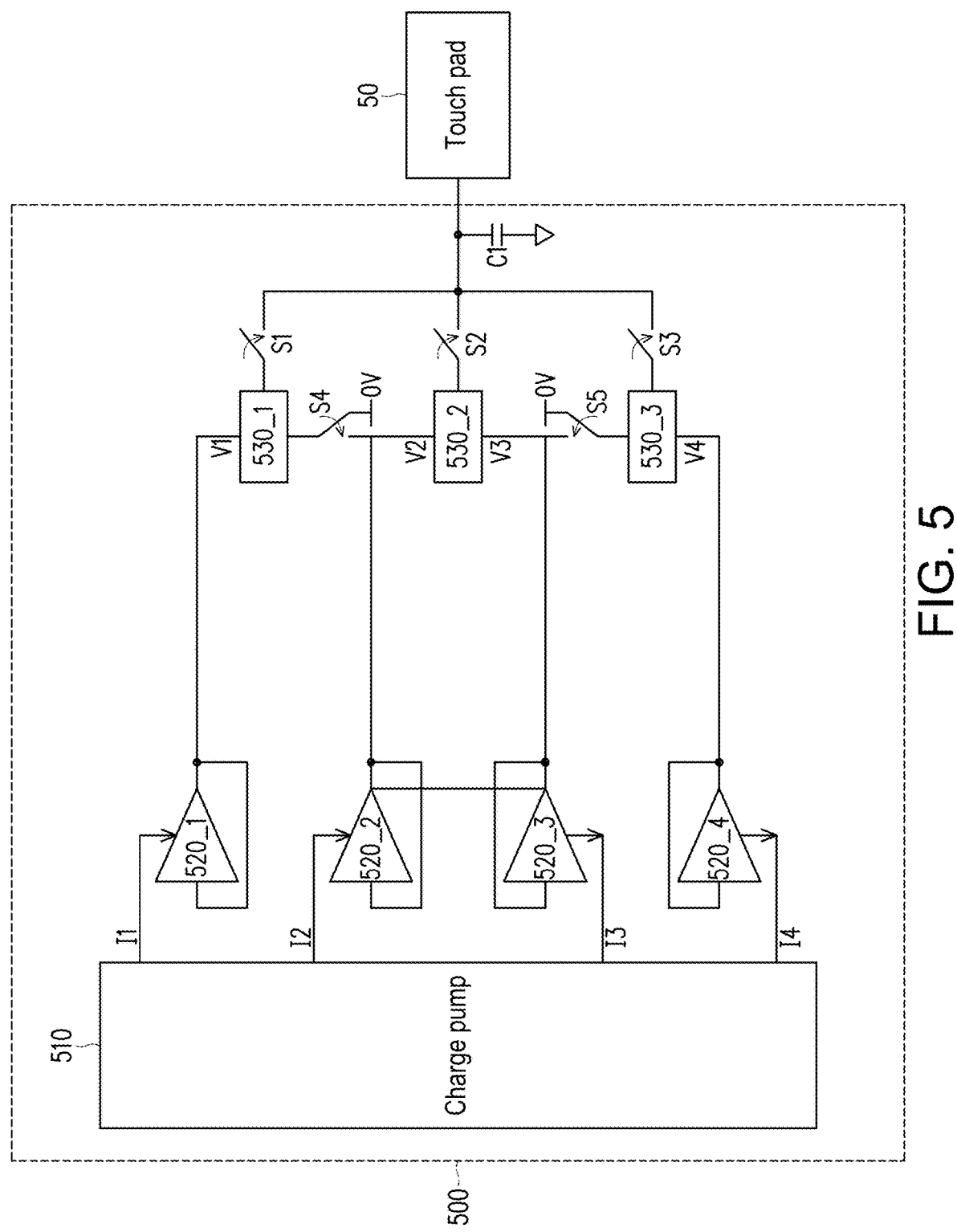
FIG. 5 is a schematic diagram of a touch driving circuit according to an embodiment of the disclosure.

FIG. 5 is a schematic diagram of a touch driving circuit according to an embodiment of the disclosure. Referring to FIG. 5, the touch driving circuit 500 includes a charge pump 510, a plurality of regulators 520_1 to 520_4, a plurality of DACs 530_1 to 530_3, a switch circuit 540 and a capacitor C1. The switch circuit 540 includes a plurality of switches S1 to S5. The switch S1 is coupled between an output terminal of the DAC 530_1 and the touch panel 50. The switch S2 is coupled between an output terminal of the DAC 530_2 and the touch panel 50. The switch S3 is coupled between an output terminal of the DAC 530_3 and the touch panel 50. The switch S4 is coupled between the DAC 530_1 and the regulator 520_2, and configured to switch to couple the output terminal of the regulator 520_2 or the ground voltage (0V) to the DAC 530_1. The switch S5 is coupled between the DAC 530_3 and the regulator 520_3, and configured to switch to couple the output terminal of the regulator 520_3 or the ground voltage (0V) to the DAC 530_3.

In the embodiment of the disclosure, a power input terminal of the regulator 520_1 is coupled to the charge pump 510, and receives a charging current I1 from the charge pump 510. An input terminal of the regulator 520_1 is coupled to an output terminal of the regulator 520_1. The output terminal of the regulator 520_1 generates a charging voltage V1 according to the charging current I1, and provides the charging voltage V1 to the DAC 530_1. The DAC 530_1 receives the charging voltage V1. The DAC 530_1 is operated between the charging voltage V1 and a ground voltage (0V), or is operated between the charging voltage V1 and the charging voltage V2. The DAC 530_1 outputs a first driving voltage to a first terminal of the switch S1 by converting the charging voltage V1 or the ground voltage (0V).

In the embodiment of the disclosure, a power input terminal of the regulator 520_2 is coupled to the charge pump 510, and receives a charging current I2 from the charge pump 510. An input terminal of the regulator 520_2 is coupled to an output terminal of the regulator 520_2. The output terminal of the regulator 520_2 generates a charging voltage V2 according to the charging current I2, and provides the charging voltage V2 to the DAC 530_2.

In the embodiment of the disclosure, a power input terminal of the regulator 520_3 is coupled to the charge pump 510, and receives a discharging current I3 from the charge pump 510. An input terminal of the regulator 520_3 is coupled to an output terminal of the regulator 520_3. The output terminal of the regulator 520_3 generates a charging voltage V3 according to the discharging current I3, and provides the charging voltage V3 to the DAC 530_3.

The DAC 530_2 receives the charging voltages V2 and V3, and is operated between the charging voltage V2 and the charging voltage V3. The DAC 530_2 outputs a second driving voltage to a first terminal of the switch S2 by converting the charging voltage V2 or the charging voltage V3.

In the embodiment of the disclosure, a power input terminal of the regulator 520_4 is coupled to the charge pump 510, and receives a charging current I4 from the charge pump 510. An input terminal of the regulator 520_4 is coupled to an output terminal of the regulator 520_4. The output terminal of the regulator 520_4 generates a charging voltage V4 according to the charging current I4, and provides the charging voltage V4 to the DAC 530_3. The DAC 530_3 receives the charging voltage V4. The DAC 530_3 is operated between the charging voltage V4 and the ground voltage (0V), or is operated between the charging voltage V3 and the charging voltage V4. The DAC 530_3 outputs a third driving voltage to a first terminal of the switch S3 by converting the charging voltage V3, the charging voltage V4 or the ground voltage (0V).

In the embodiment of the disclosure, the charging voltages V1 to V4 have different voltage levels. The second terminals of the switches S1 to S3 are coupled to a first terminal of the capacitor C1 and the touch panel 50. A second terminal of the capacitor C1 is coupled to the ground voltage. In the embodiment of the disclosure, the switches S1 to S5 are selectively switched to provide multi-stage charging voltages to charge the capacitor C1, and the capacitor C1 outputs the corresponding driving voltages to form a driving signal 501 to the touch panel 50.

Figure 6:
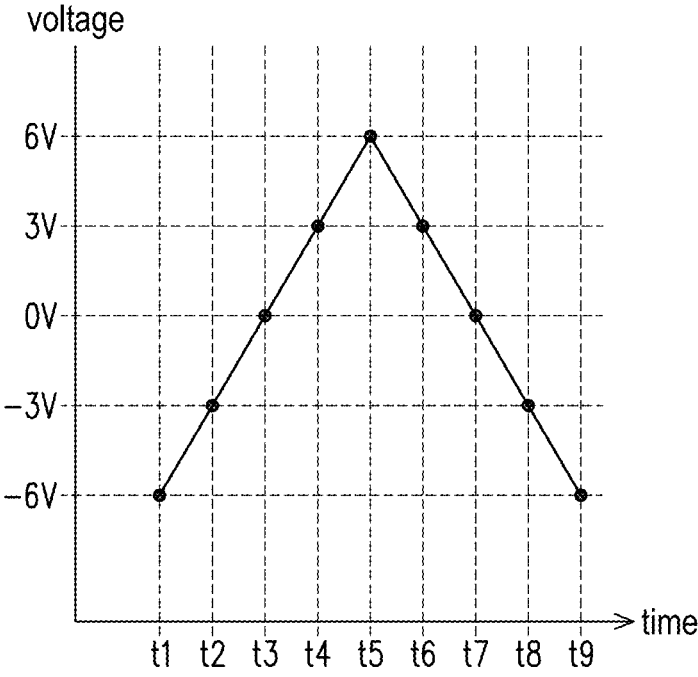
FIG. 6 is a waveform diagram of a driving signal according to an embodiment of the disclosure.

FIG. 6 is a waveform diagram of a driving signal according to an embodiment of the disclosure. Referring to FIG. 5 and FIG. 6, in one embodiment of the disclosure, the touch driving circuit 500 may generate the driving signal 501 from +6 volts (V) to −6 volts. The charge pump 510 may provide a voltage of +3.3 volts corresponding to a plurality of charge currents or a discharge currents to the regulators 520_1 to 520_4. That is, if the charging voltage V1 is +6 volts, the charge pump 510 need output double the current to the regulator 520_1. For example, the charging current I1 may be equal to 2×I, where symbol I represents a fixed ampere of current outputted from the charge pump 510. If the charging voltage V2 is +3 volts, the charge pump 510 need output the current to the regulator 520_2. For example, the charging current I2 may be equal to I. If the charging voltage V3 is −3 volts, the charge pump 510 need draw the current from the regulator 520_3. For example, the discharging current I3 may be equal to I. If the charging voltage V4 is −6 volts, the charge pump 510 need draw the current from the regulator 520_4. For example, the discharging current I4 may be equal to 2×I.

As shown in FIG. 6, in one embodiment of the disclosure, the touch driving circuit 500 may firstly rising the driving signal 501 from −6 volts to −3 volts. During a period from time t1 to time t2, the switch S3 may be turned-on, and the switch S5 may be switched to conduct the regulator 520_3 to obtain the charging voltage V3. The DAC 530_3 may provide the voltage of −3 volt to the capacitor C1 through the switch S3, so that the driving signal 501 may be raised from −6 volts to −3 volts. In this regard, the power consumption of the charge pump 510 may be equal to −3×I×C during the period from time t1 to time t2.

Then, the touch driving circuit 500 may rise the driving signal 501 from −3 volts to 0 volts. During a period from time t2 to time t3, the switch S3 may be turned-on, and the switch S5 may be switched to conduct the ground voltage (0V). The DAC 530_3 may provide the voltage of 0 volt to the capacitor C1 through the switch S3, so that the driving signal 501 may be raised from −3 volts to 0 volts. In this regard, the power consumption of the charge pump 510 may be 0 during the period from time t2 to time t3 because the charge pump 510 does not need to provide the power.

Then, the touch driving circuit 500 may rise the driving signal 501 from 0 volts to +3 volts. During a period from time t3 to time t4, the switch S2 may be turned-on, and the DAC 530_2 may provide the voltage of +3 volt to the capacitor C1 through the switch S2, so that the driving signal 501 may be raised from 0 volts to +3 volts. In this regard, the power consumption of the charge pump 510 may be equal to 3×I×C during the period from time t3 to time t4.

Then, the touch driving circuit 500 may rise the driving signal 501 from +3 volts to +6 volts. During a period from time t4 to time t5, the switch S1 may be turned-on, and the DAC 530_1 may provide the voltage of +6 volt to the capacitor C1 through the switch S1, so that the driving signal 501 may be raised from +3 volts to +6 volts. In this regard, the power consumption of the charge pump 510 may be equal to 3×2×I×C during the period from time t4 to time t5.

Then, the touch driving circuit 500 may reduce the driving signal 501 from +6 volts to +3 volts. During a period from time t5 to time t6, the switch S1 may be turned-on, and the switch S4 may be switched to conduct the regulator 520_2 to obtain the charging voltage V2. The DAC 530_2 may provide the voltage of +3 volt to the capacitor C1 through the switches S1 and S4, so that the driving signal 501 may be reduced from +6 volts to +3 volts. In this regard, the power consumption of the charge pump 510 may be equal to −3×I×C during the period from time t5 to time t6.

Then, the touch driving circuit 500 may reduce the driving signal 501 from +3 volts to 0 volts. During a period from time t6 to time t7, the switch S1 may be turned-on, and the switch S4 may be switched to conduct the ground voltage (0V). The DAC 530_2 may provide the ground voltage (0V) to the capacitor C1 through the switches S1 and S4, so that the driving signal 501 may be reduced from +3 volts to 0 volts. In this regard, the power consumption of the charge pump 510 may be 0 because the charge pump 510 does not need to provide the power.

Then, the touch driving circuit 500 may reduce the driving signal 501 from 0 volts to −3 volts. During a period from time t6 to time t7, the switch S3 may be turned-on, and the switch S5 may be switched to conduct the regulator 520_3 to obtain the charging voltage V3. The DAC 530_3 may provide the voltage of −3 volt to the capacitor C1 through the switches S3 and S5, so that the driving signal 501 may be reduced from 0 volts to −3 volts. In this regard, the power consumption of the charge pump 510 may be equal to −3×I×C during the period from time t6 to time t7.

Then, the touch driving circuit 500 may reduce the driving signal 501 from −3 volts to −6 volts. During a period from time t7 to time t8, the switch S3 may be turned-on, and the DAC 530_3 may provide the voltage of −6 volt to the capacitor C1 through the switch S3, so that the driving signal 501 may be reduced from −3 volts to −6 volts. In this regard, the power consumption of the charge pump 510 may be equal to −3×2×I×C during the period from time t7 to time t8.

Therefore, the touch driving circuit 500 of the embodiment may achieve an effective high voltage charging function between −6 volts to +6 volts and the power consumption may be approximately 12×I×C (i.e. (−3+0+3+6−3+0+3+6)× I×C).

Figure 7:
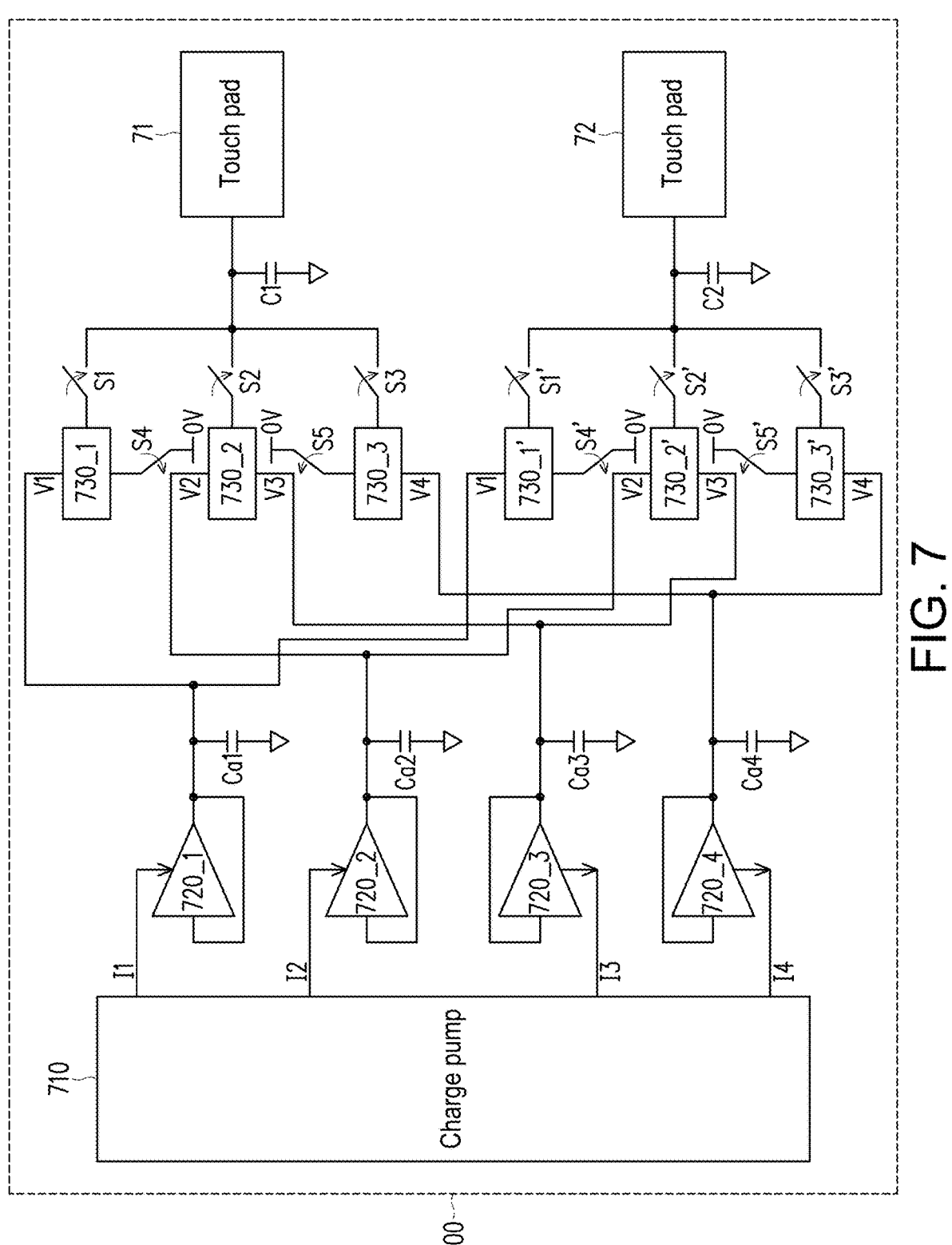
FIG. 7 is a schematic diagram of a touch driving circuit according to an embodiment of the disclosure.

FIG. 7 is a schematic diagram of a touch driving circuit according to an embodiment of the disclosure. Referring to FIG. 7, the touch driving circuit 700 includes a charge pump 710, a plurality of regulators 720_1 to 720_4, 720_1' to 720_4', a plurality of DACs 730_1 to 730_3, 730_1' to 730_3', two switch circuits 740, 740' and a capacitor C1. The switch circuit 740 includes a plurality of switches S1 to S5. The switch circuit 740' includes a plurality of switches S1' to S5'. In the embodiment of the disclosure, the one set of the regulators may support multiple set of the DACs, and the switch circuits 740, 740' may output two driving signals 701 and 702 for driving the different touch pads in the touch panel 70 at the same time.

In the embodiment of the disclosure, the switch S1 is coupled between the DAC 730_1 and the touch panel 70. The switch S2 is coupled between the DAC 730_2 and the touch panel 70. The switch S3 is coupled between the DAC 730_3 and the touch panel 70. The switch S4 is coupled between the DAC 730_1 and the regulator 720_2, and configured to switch to couple the output terminal of the regulator 720_2 or the ground voltage (0V) to the DAC 730_1. The switch S5 is coupled between the DAC 730_3 and the regulator 720_3, and configured to switch to couple the output terminal of the regulator 720_3 or the ground voltage (0V) to the DAC 730_3.

In the embodiment of the disclosure, the switch S1' is coupled between the DAC 730_1' and the touch panel 70. The switch S2' is coupled between the DAC 730_2' and the touch panel 70. The switch S3' is coupled between the DAC 730_3' and the touch panel 70. The switch S4' is coupled between the DAC 730_1' and the regulator 720_2', and configured to switch to couple the output terminal of the regulator 720_2' or the ground voltage (0V) to the DAC 730_1'. The switch S5' is coupled between the DAC 730_3' and the regulator 720_3', and configured to switch to couple the output terminal of the regulator 720_3' or the ground voltage (0V) to the DAC 730_3'.

In the embodiment of the disclosure, a power input terminal of the regulator 720_1 is coupled to the charge pump 710, and receives a charging current I1 from the charge pump 710. An input terminal of the regulator 720_1 is coupled to an output terminal of the regulator 720_1. The output terminal of the regulator 720_1 generates a charging voltage V1 according to the charging current I1, and provides the charging voltage V1 to the DACs 730_1 and 730_1'. The DAC 730_1 and 730_1' receive the charging voltage V1. The DACs 730_1 and 730_1' are operated between the charging voltage V1 and a ground voltage (0V), or are operated between the charging voltage V1 and the charging voltage V2. The DACs 730_1 and 730_1' respectively outputs a first driving voltage to first terminals of the switches S1 and S1' by converting the charging voltage V1, the charging voltage V2 or the ground voltage (0V).

In the embodiment of the disclosure, a power input terminal of the regulator 720_2 is coupled to the charge pump 710, and receives a charging current I2 from the charge pump 710. An input terminal of the regulator 720_2 is coupled to an output terminal of the regulator 720_2. The output terminal of the regulator 720_2 generates a charging voltage V2 according to the charging current I2, and provides the charging voltage V2 to the DACs 730_2 and 730_2'.

In the embodiment of the disclosure, a power input terminal of the regulator 720_3 is coupled to the charge pump 710, and receives a discharging current I3 from the charge pump 710. An input terminal of the regulator 720_3 is coupled to an output terminal of the regulator 720_3. The output terminal of the regulator 720_3 generates a charging voltage V3 according to the discharging current I3, and provides the charging voltage V3 to the DACs 730_3 and 730_3'.

The DACs 730_2 and 730_2' respectively receives the charging voltages V2 and V3, and are operated between the charging voltage V2 and the charging voltage V3. The DACs 730_2, 730_2' respectively output a second driving voltage to a first terminal of the switches S2 and S2' by converting the charging voltage V2 or the charging voltage V3.

In the embodiment of the disclosure, a power input terminal of the regulator 720_4 is coupled to the charge pump 710, and receives a charging current I4 from the charge pump 710. An input terminal of the regulator 720_4 is coupled to an output terminal of the regulator 720_4. The output terminal of the regulator 720_4 generates a charging voltage V4 according to the charging current I4, and provides the charging voltage V4 to the DACs 730_3 and 730_3'. The DAC 730_3 and 730_3' receive the charging voltage V4. The DAC 730_3 and 730_3' are operated between the charging voltage V4 and the ground voltage (0V), or are operated between the charging voltage V3 and the charging voltage V4. The DACs 730_3 and 730_3' respectively outputs a third driving voltage to first terminals of the switches S3 and S3' by converting the charging voltage V3, the charging voltage V4 or the ground voltage (0V).

In the embodiment of the disclosure, the charging voltages V1 to V4 have different voltage levels. The second terminals of the switches S1 to S3 are coupled to a first terminal of the capacitor C1 and the touch panel 70. The second terminals of the switches S1' to S3' are coupled to a first terminal of the capacitor C2 and the touch panel 70. A second terminal of the capacitor C1 is coupled to the ground voltage. A second terminal of the capacitor C2 is coupled to the ground voltage. In the embodiment of the disclosure, the switches S1 to S5 are selectively switched to provide multi-stage charging voltages to charge the capacitor C1, and the capacitor C1 outputs the corresponding driving voltages to form a driving signal 701 to the touch panel 70. The switches S1' to S5' are selectively switched to provide multi-stage charging voltages to charge the capacitor C2, and the capacitor C2 outputs the corresponding driving voltages to form a driving signal 702 to the touch panel 70.

In the embodiment of the disclosure, the DACs 730_1 to 730_3 are configured to output a plurality of driving voltages according to the charging voltages V1 to V4. The switch circuit 740 is configured to output the a plurality of driving voltages in a time-sharing manner to form the driving signal 701 for the touch panel 70. In the embodiment of the disclosure, the DACs 730_1' to 730_3' are configured to output a plurality of driving voltages according to the charging voltages V1 to V4. The switch circuit 740' is configured to output the a plurality of driving voltages in a time-sharing manner to form the driving signal 702 for the touch panel 70.

In addition, the touch driving circuit 700 may further include a plurality of parasitic capacitors Ca1 to Ca4, the parasitic capacitors Ca1 to Ca4 are respectively coupled to the output terminal of the regulators 720_1 to 720_4. In one embodiment of the disclosure, the parasitic capacitors Ca1 to Ca4 may respectively configured to store the discharging current from one of DACs 730_1 to 730_3 and 730_1' to 730_3', and provide the corresponding charging voltage to the another one of DACs 730_1 to 730_3 and 730_1' to 730_3'. In other words, one of the driving voltages provided by one of the DACs 730_1 to 730_3, 730_1' to 730_3' may be firstly stored in the capacitor C1 (or the capacitor C2), and the capacitor C1 (or the capacitor C2) may provide the stored voltage to one of the parasitic capacitors Ca1 to Ca4. Then, the one of the parasitic capacitors Ca1 to Ca4 may provide the stored voltage to the capacitor C2 (or the capacitor C1) through one of the DACs 730_1 to 730_3, 730_1' to 730_3' to be as the another one of the driving voltages.

Figure 8:
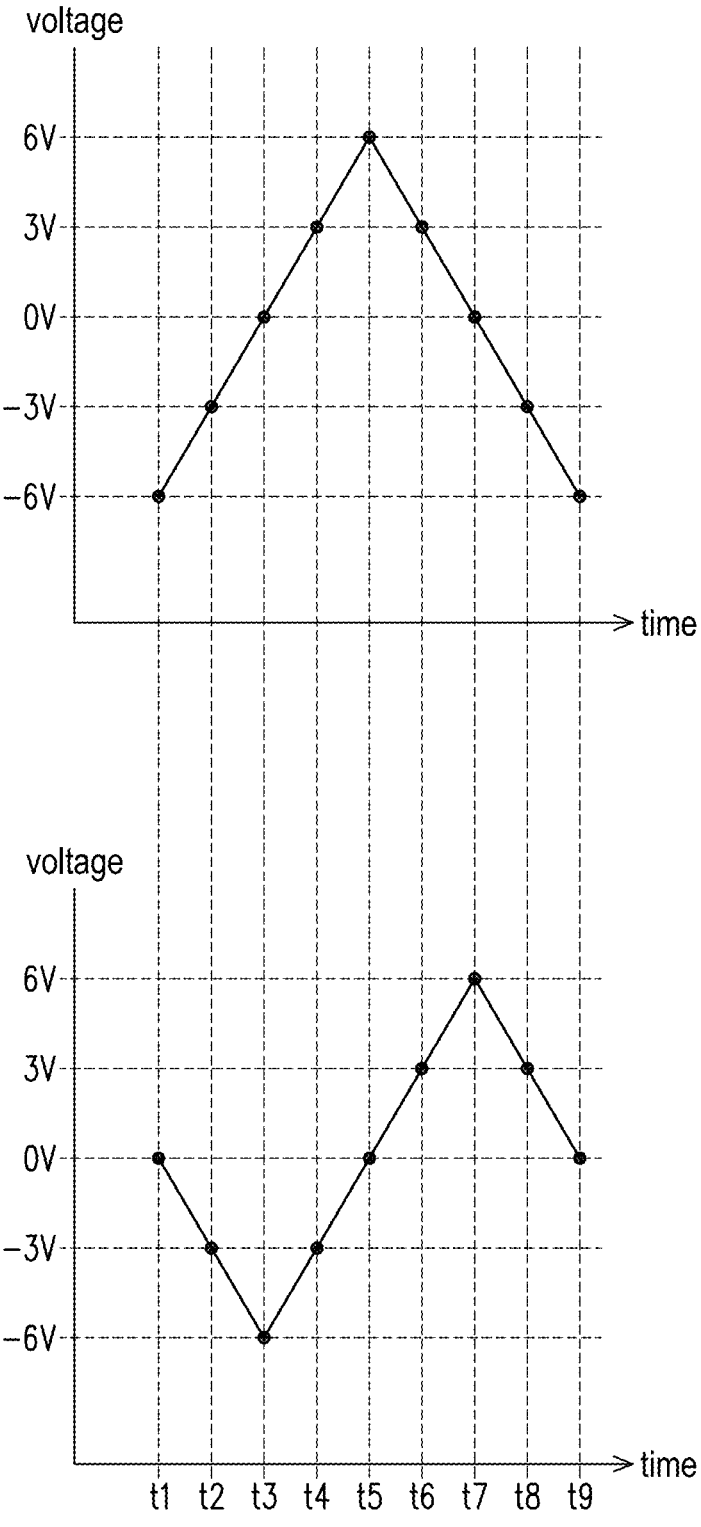
FIG. 8 is a waveform diagram of a driving signal according to an embodiment of the disclosure.

FIG. 8 is a waveform diagram of a driving signal according to an embodiment of the disclosure Referring to FIG. 7 and FIG. 8, in one embodiment of the disclosure, the touch driving circuit 700 may respectively generate the driving signal 701 and the driving signal 701' from +6 volts (V) to −6 volts. The charge pump 710 may provide a voltage of +3.3 volts corresponding to a plurality of charge currents or a discharge currents to the regulators 720_1 to 720_4. That is, if the charging voltage V1 is +6 volts, the charge pump 710 need output double the current to the regulator 720_1. For example, the charging current I1 may be equal to 2×I, where symbol I represents a fixed ampere of current outputted from the charge pump 710. If the charging voltage V2 is +3 volts, the charge pump 710 need output the current to the regulator 720_2. For example, the charging current I2 may be equal to I. If the charging voltage V3 is −3 volts, the charge pump 710 need draw the current from the regulator 720_3. For example, the discharging current I3 may be equal to I. If the charging voltage V4 is −6 volts, the charge pump 710 need draw the current from the regulator 720_4. For example, the discharging current I4 may be equal to 2×I.

As shown in FIG. 8, in one embodiment of the disclosure, the touch driving circuit 700 may rise the driving signal 701 from −6 volts to −3 volts, and reduce the driving signal 702 from 0 volts to −3 volts. During a period from time t1 to time t2, the switch S3 may be turned-on, and the switch S5 may be switched to conduct the regulator 720_3 to obtain the charging voltage V3. The DAC 730_3 may provide the voltage of −3 volt to the capacitor C1 through the switches S3 and S5, so that the driving signal 701 may be raised from −6 volts to −3 volts. At the same time, the switch S3' may be turned-on, and the switch S5' may be switched to conduct the regulator 720_3' to obtain the charging voltage V3. The DAC 730_3' may provide the voltage of −3 volt to the capacitor C2 through the switches S2', so that the driving signal 702 may be reduced from 0 volts to −3 volts.

It should be noted that, the driving voltage of −3 volts may be stored into the capacitor C1, and be further stored into the parasitic capacitor Ca3 though the capacitor C1. Hence, the parasitic capacitor Ca3 may be used as a power source to provide the driving voltage of −3 volts to the capacitor C2 through the switch S2'. Therefore, the power consumption of the charge pump 710 may be effectively reduced.

Then, the touch driving circuit 700 may rise the driving signal 701 from −3 volts to 0 volts, and reduce the driving signal 702 from −3 volts to −6 volts. During a period from time t2 to time t3, the switch S3 may be turned-on, and the switch S5 may be switched to conduct the ground voltage (0V). The DAC 730_3 may provide the voltage of 0 volt to the capacitor C1 through the switches S3 and S5, so that the driving signal 701 may be raised from −3 volts to 0 volts. At the same time, the switch S3' may be turned-on, and the DAC 730_3' may provide the voltage of −6 volt to the capacitor C2 through the switch S3', so that the driving signal 702 may be reduced from −3 volts to −6 volts.

Then, the touch driving circuit 700 may rise the driving signal 701 from 0 volts to +3 volts, and rise the driving signal 702 from −6 volts to −3 volts. During a period from time t3 to time t4, the switch S2 may be turned-on, and the DAC 730_2 may provide the voltage of +3 volt to the capacitor C1 through the switch S2, so that the driving signal 701 may be raised from 0 volts to +3 volts. At the same time, the switch S3' may be turned-on, and the switch S5' may be switched to conduct the regulator 720_3' to obtain the charging voltage V3. The DAC 730_3' may provide the voltage of −3 volt to the capacitor C2 through the switches S3' and S5', so that the driving signal 702 may be raised from −6 volts to −3 volts.

Then, the touch driving circuit 700 may rise the driving signal 701 from +3 volts to +6 volts, and rise the driving signal 702 from −3 volts to 0 volts. During a period from time t4 to time t5, the switch S1 may be turned-on, and the DAC 730_1 may provide the voltage of +6 volt to the capacitor C1 through the switch S1, so that the driving signal 701 may be raised from +3 volts to +6 volts. At the same time, the switch S3' may be turned-on, and the switch S5' may be switched to conduct the ground voltage (0V). The DAC 730_3' may provide the voltage of 0 volt to the capacitor C2 through the switches S3' and S5', so that the driving signal 702 may be raised from −3 volts to 0 volts.

Then, the touch driving circuit 700 may reduce the driving signal 701 from +6 volts to +3 volts, and rise the driving signal 702 from 0 volts to +3 volts. During a period from time t5 to time t6, the switch S1 may be turned-on, and the switch S4 may be switched to conduct the regulator 720_2 to obtain the charging voltage V2. The DAC 730_2 may provide the voltage of +3 volt to the capacitor C1 through the switches S1 and S4, so that the driving signal 701 may be reduced from +6 volts to +3 volts. At the same time, the switch S2' may be turned-on, and the DAC 730_2' may provide the voltage of +3 volt to the capacitor C2 through the switch S2', so that the driving signal 702 may be raised from 0 volts to +3 volts.

Then, the touch driving circuit 700 may reduce the driving signal 701 from +3 volts to 0 volts, and rise the driving signal 702 from +3 volts to +6 volts. During a period from time t6 to time t7, the switch S1 may be turned-on, and the switch S4 may be switched to conduct the ground voltage (0V). The DAC 730_2 may provide the ground voltage (0V) to the capacitor C1 through the switches S1 and S4, so that the driving signal 701 may be reduced from +3 volts to 0 volts. At the same time, the switch S1' may be turned-on, and the DAC 730_1' may provide the voltage of +6 volt to the capacitor C2 through the switch S1', so that the driving signal 702 may be raised from +3 volts to +6 volts.

Then, the touch driving circuit 700 may reduce the driving signal 701 from 0 volts to −3 volts, and reduce the driving signal 702 from +6 volts to +3 volts. During a period from time t7 to time t8, the switch S3 may be turned-on, and the switch S5 may be switched to conduct the regulator 720_3 to obtain the charging voltage V3. The DAC 730_3 may provide the voltage of −3 volt to the capacitor C1 through the switches S3 and S5, so that the driving signal 701 may be reduced from 0 volts to −3 volts. At the same time, the switch S1' may be turned-on, and the switch S4' may be switched to conduct the regulator 720_2' to obtain the charging voltage V2. The DAC 730_2' may provide the voltage of +3 volt to the capacitor C2 through the switches S1' and S4', so that the driving signal 702 may be reduced from +6 volts to +3 volts.

Then, the touch driving circuit 700 may reduce the driving signal 701 from −3 volts to −6 volts, and reduce the driving signal 702 from +3 volts to 0 volts. During a period from time t8 to time t9, the switch S3 may be turned-on, and the DAC 730_3 may provide the voltage of −6 volt to the capacitor C1 through the switch S3, so that the driving signal 701 may be reduced from −3 volts to −6 volts. At the same time, the switch S1' may be turned-on, and the switch S4' may be switched to conduct the ground voltage (0V). The DAC 730_2' may provide the ground voltage (0V) to the capacitor C2 through the switches S1' and S4', so that the driving signal 702 may be reduced from +3 volts to 0 volts.

In one embodiment of the disclosure, the driving signal 701 and the driving signal 702 may have different frequencies. In one embodiment of the disclosure, the driving signal 701 and the driving signal 702 may have different phases.

Figure 9:
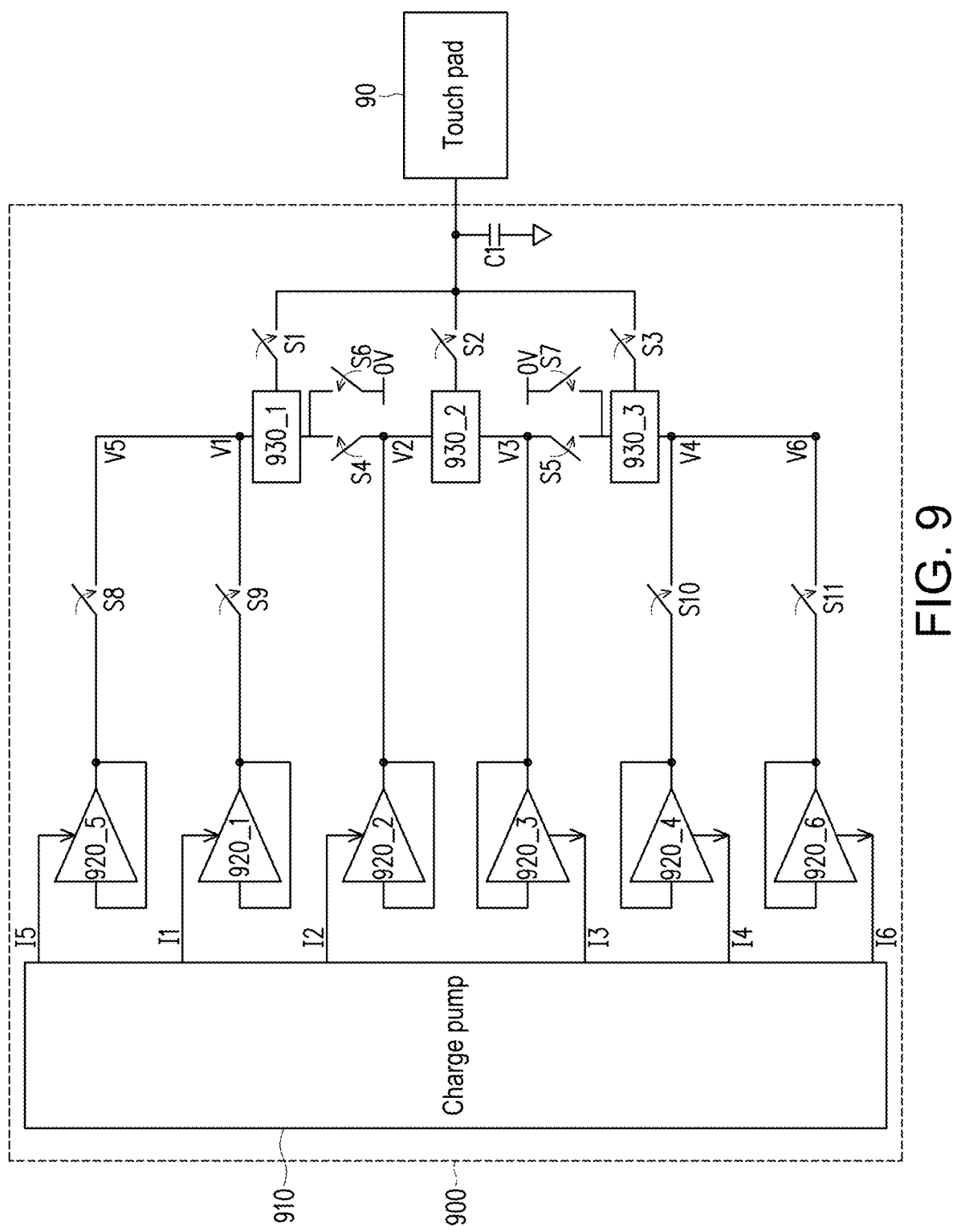
FIG. 9 is a schematic diagram of a touch driving circuit according to an embodiment of the disclosure.

FIG. 9 is a schematic diagram of a touch driving circuit according to an embodiment of the disclosure. Referring to FIG. 9, the touch driving circuit 900 includes a charge pump 910, a plurality of regulators 920_1 to 920_6, a plurality of DACs 930_1 to 930_3, a switch circuit 940 and a capacitor C1. The switch circuit 940 includes a plurality of switches S1 to S11. The switch S1 is coupled between the DAC 930_1 and the touch panel 90. The switch S2 is coupled between the DAC 930_2 and the touch panel 90. The switch S3 is coupled between the DAC 930_3 and the touch panel 90. The switch S4 is coupled between the DAC 930_1 and the regulator 920_2, and configured to switch to couple or decouple the output terminal of the regulator 920_2 and the DAC 930_1. The switch S5 is coupled between the DAC 930_3 and the regulator 920_3, and configured to switch to couple or decouple the output terminal of the regulator 920_3 and the DAC 930_3. The switch S6 is coupled between the DAC 930_1 and the ground voltage (0V), and configured to switch to couple or decouple the DAC 930_1 and the ground voltage (0V). The switch S7 is coupled between the DAC 930_3 and the ground voltage (0V), and configured to switch to couple or decouple the DAC 930_3 and the ground voltage (0V).

The switch S8 is coupled between the regulator 920_5 and the DAC 930_1, and configured to switch to couple or decouple the regulator 920_5 and the DAC 930_1. The switch S9 is coupled between the regulator 920_1 and the DAC 930_1, and configured to switch to couple or decouple the regulator 920_1 and the DAC 930_1. The switch S10 is coupled between the regulator 920_4 and the DAC 930_3, and configured to switch to couple or decouple the regulator 920_4 and the DAC 930_3. The switch S11 is coupled between the regulator 920_6 and the DAC 930_3, and configured to switch to couple or decouple the regulator 920_6 and the DAC 930_3.

In the embodiment of the disclosure, a power input terminal of the regulator 920_1 is coupled to the charge pump 910, and receives a charging current I1 from the charge pump 910. An input terminal of the regulator 920_1 is coupled to an output terminal of the regulator 920_1. The output terminal of the regulator 920_1 generates a charging voltage V1 according to the charging current I1, and provides the charging voltage V1 to the DAC 930_1 through the switch S9.

In the embodiment of the disclosure, a power input terminal of the regulator 920_2 is coupled to the charge pump 910, and receives a charging current I2 from the charge pump 910. An input terminal of the regulator 920_2 is coupled to an output terminal of the regulator 920_2. The output terminal of the regulator 920_2 generates a charging voltage V2 according to the charging current I2, and provides the charging voltage V2 to the DAC 930_2.

In the embodiment of the disclosure, a power input terminal of the regulator 920_3 is coupled to the charge pump 910, and receives a discharging current I3 from the charge pump 910. An input terminal of the regulator 920_3 is coupled to an output terminal of the regulator 920_3. The output terminal of the regulator 920_3 generates a charging voltage V3 according to the discharging current I3, and provides the charging voltage V3 to the DAC 930_3.

In the embodiment of the disclosure, a power input terminal of the regulator 920_4 is coupled to the charge pump 910, and receives a charging current I4 from the charge pump 910. An input terminal of the regulator 920_4 is coupled to an output terminal of the regulator 920_4. The output terminal of the regulator 920_4 generates a charging voltage V4 according to the discharging current I4, and provides the charging voltage V4 to the DAC 930_3 through the switch S10.

In the embodiment of the disclosure, a power input terminal of the regulator 920_5 is coupled to the charge pump 910, and receives a charging current I5 from the charge pump 910. An input terminal of the regulator 920_5 is coupled to an output terminal of the regulator 920_5. The output terminal of the regulator 920_5 generates a charging voltage V5 according to the charging current I5, and provides the charging voltage V5 to the DAC 930_1 through the switch S8.

In the embodiment of the disclosure, a power input terminal of the regulator 920_6 is coupled to the charge pump 910, and receives a discharging current I6 from the charge pump 910. An input terminal of the regulator 920_6 is coupled to an output terminal of the regulator 920_6. The output terminal of the regulator 920_6 generates a charging voltage V6 according to the charging current I6, and provides the charging voltage V6 to the DAC 930_1 through the switch S11.

In the embodiment of the disclosure, the DAC 930_1 is configured to output a first driving voltage by converting the charging voltage V1, the charging voltage V4, the charging voltage V5 or the ground voltage. In the embodiment of the disclosure, the DAC 930_2 is configured to output a second driving voltage by converting the charging voltage V2 or the charging voltage V3. In the embodiment of the disclosure, the DAC 930_3 is configured to output a third driving voltage by converting the charging voltage V3, the charging voltage V4, the charging voltage V6 or the ground voltage.

In the embodiment of the disclosure, the charging voltages V1 to V6 have different voltage levels. The second terminals of the switches S1 to S3 are coupled to a first terminal of the capacitor C1 and the touch panel 90. A second terminal of the capacitor C1 is coupled to the ground voltage. In the embodiment of the disclosure, the switches S1 to S11 are selectively switched to provide multi-stage charging voltages to charge the capacitor C1, and the capacitor C1 outputs the corresponding driving voltages to form a driving signal 901 to the touch panel 90.

Figure 10:
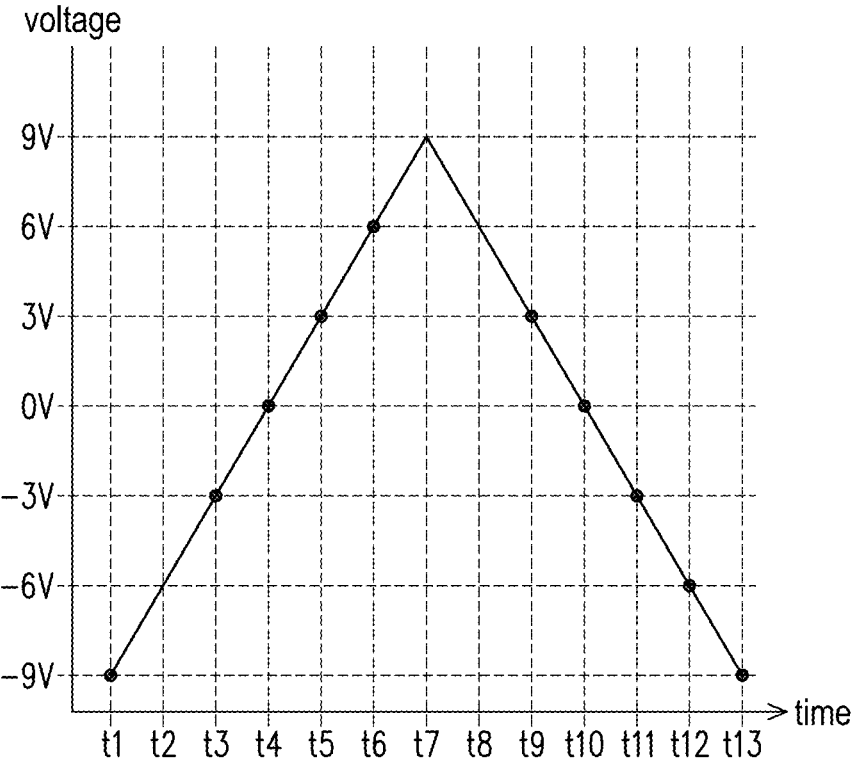
FIG. 10 is a waveform diagram of a driving signal according to an embodiment of the disclosure.

FIG. 10 is a waveform diagram of a driving signal according to an embodiment of the disclosure. Referring to FIG. 9 and FIG. 10, in one embodiment of the disclosure, the touch driving circuit 900 may generate the driving signal 901 from +9 volts (V) to −9 volts. The charge pump 910 may provide a voltage of +3.3 volts corresponding to a plurality of charge currents or a discharge currents to the regulators 920_1 to 920_6. That is, if the charging voltage V1 is +6 volts, the charge pump 910 need output double the current to the regulator 920_1. For example, the charging current I1 may be equal to 2×I. If the charging voltage V2 is +3 volts, the charge pump 910 need output the current to the regulator 920_2. For example, the charging current I2 may be equal to I. If the charging voltage V3 is −3 volts, the charge pump 910 need draw the current from the regulator 920_3. For example, the discharging current I3 may be equal to I. If the charging voltage V4 is −6 volts, the charge pump 910 need draw the current from the regulator 920_4. For example, the discharging current I4 may be equal to 2×I. If the charging voltage V5 is +9 volts, the charge pump 910 need output triple the current to the regulator 920_5. For example, the charging current I5 may be equal to 3×I. If the charging voltage V6 is −9 volts, the charge pump 910 need draw the current from the regulator 920_6. For example, the discharging current I6 may be equal to 3×I.

As shown in FIG. 10, in one embodiment of the disclosure, the touch driving circuit 900 may firstly rising the driving signal 901 from −9 volts to −3 volts. During a period from time t1 to time t2, the switch S3 may be turned-on, and the switch S5 may be switched to conduct the regulator 920_3 to obtain the charging voltage V3. The DAC 930_3 may provide the voltage of −3 volt to the capacitor C1 through the switches S3 and S5, so that the driving signal 901 may be raised from −9 volts to −3 volts. In this regard, the power consumption of the charge pump 910 may be equal to −6×I×C during the period from time t1 to time t2.

Then, the touch driving circuit 900 may rise the driving signal 901 from −3 volts to 0 volts. During a period from time t2 to time t3, the switch S3 may be turned-on, and the switch S7 may be switched to conduct the ground voltage (0V). The DAC 930_3 may provide the voltage of 0 volt to the capacitor C1 through the switches S3 and S7, so that the driving signal 901 may be raised from −3 volts to 0 volts. In this regard, the power consumption of the charge pump 910 may be 0 during the period from time t2 to time t3 because the charge pump 910 does not need to provide the power.

Then, the touch driving circuit 900 may rise the driving signal 901 from 0 volts to +3 volts. During a period from time t3 to time t4, the switch S2 may be turned-on, and the DAC 930_2 may provide the voltage of +3 volt to the capacitor C1 through the switch S2, so that the driving signal 901 may be raised from 0 volts to +3 volts. In this regard, the power consumption of the charge pump 910 may be equal to 3×I×C during the period from time t3 to time t4.

Then, the touch driving circuit 900 may rise the driving signal 901 from +3 volts to +6 volts. During a period from time t4 to time t5, the switches S1 and S9 may be turned-on, and the DAC 930_1 may provide the voltage of +6 volt to the capacitor C1 through the switch S1, so that the driving signal 901 may be raised from +3 volts to +6 volts. In this regard, the power consumption of the charge pump 910 may be equal to 3×2×I×C during the period from time t4 to time t5.

Then, the touch driving circuit 900 may rise the driving signal 901 from +6 volts to +9 volts. During a period from time t5 to time t6, the switches S1 and S8 may be turned-on, and the DAC 930_1 may provide the voltage of +9 volt to the capacitor C1 through the switch S1, so that the driving signal 901 may be raised from +6 volts to +9 volts. In this regard, the power consumption of the charge pump 910 may be equal to 3×3×I×C during the period from time t5 to time t6.

Then, the touch driving circuit 900 may reduce the driving signal 901 from +9 volts to +3 volts. During a period from time t6 to time t7, the switch S1 may be turned-on, and the switch S4 may be switched to conduct the regulator 920_2 to obtain the charging voltage V2. The DAC 930_1 may provide the voltage of +3 volt to the capacitor C1 through the switches S1 and S4, so that the driving signal 901 may be reduced from +9 volts to +3 volts. In this regard, the power consumption of the charge pump 910 may be equal to −6×I×C during the period from time t6 to time t7.

Then, the touch driving circuit 900 may reduce the driving signal 901 from +3 volts to 0 volts. During a period from time t7 to time t8, the switch S1 may be turned-on, and the switch S6 may be switched to conduct the ground voltage (0V). The DAC 930_1 may provide the ground voltage (0V) to the capacitor C1 through the switch S1, so that the driving signal 901 may be reduced from +3 volts to 0 volts. In this regard, the power consumption of the charge pump 910 may be 0 because the charge pump 910 does not need to provide the power.

Then, the touch driving circuit 900 may reduce the driving signal 901 from 0 volts to −3 volts. During a period from time t8 to time t9, the switch S3 may be turned-on, and the switch S5 may be switched to conduct the regulator 920_3 to obtain the charging voltage V3. The DAC 930_3 may provide the voltage of −3 volt to the capacitor C1 through the switches S3 and S5, so that the driving signal 901 may be reduced from 0 volts to −3 volts. In this regard, the power consumption of the charge pump 910 may be equal to 3×I×C during the period from time t8 to time t9.

Then, the touch driving circuit 900 may reduce the driving signal 901 from −3 volts to −6 volts. During a period from time t9 to time t10, the switch S3 may be turned-on, and the switch S10 may be switched to conduct the regulator 920_4 to obtain the charging voltage V4. The DAC 930_3 may provide the voltage of −6 volt to the capacitor C1 through the switch S3, so that the driving signal 901 may be reduced from −3 volts to −6 volts. In this regard, the power consumption of the charge pump 910 may be equal to 3×2×I×C during the period from time t9 to time t10.

Then, the touch driving circuit 900 may reduce the driving signal 901 from −6 volts to −9 volts. During a period from time t10 to time t11, the switch S3 may be turned-on, and the switch S11 may be switched to conduct the regulator 920_6 to obtain the charging voltage V6. The DAC 930_6 may provide the voltage of −9 volt to the capacitor C1 through the switch S3, so that the driving signal 901 may be reduced from −6 volts to −9 volts. In this regard, the power consumption of the charge pump 910 may be equal to 3×3×I×C during the period from time t10 to time t11.

Therefore, the touch driving circuit 900 of the embodiment may achieve an effective high voltage charging function between −9 volts to +9 volts and the power consumption may be approximately 24×I×C (i.e. (−6+0+3+6+9−6+0+3+6+9)×I×C).

In summary, the touch driving circuit and touch driving method of the disclosure may may achieve high-voltage driving effects through multi-stage charging by the plurality of DACs and the switch circuit.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch driving circuit, comprising:
   a charge pump, configured to output a plurality of currents;
   a plurality of regulators, coupled to the charge pump, and configured to output a plurality of charging voltages according to the plurality of currents;
   a plurality of digital to analog converters, coupled to the plurality of regulators, and configured to output a plurality of driving voltages according to the plurality of charging voltages,
   a switch circuit, coupled to the plurality of digital to analog converters and a touch panel, and configured to output the plurality of driving voltages in a time-sharing manner to form a driving signal for the touch panel,
   wherein the plurality of regulators comprises:
   a first regulator, coupled to the charge pump, and configured to receive a first current and output a first charging voltage;
   a second regulator, coupled to the charge pump, and configured to receive a second current and output a second charging voltage;

a third regulator, coupled to the charge pump, and configured to receive a third current and output a third charging voltage; and a fourth regulator, coupled to the charge pump, and configured to receive a fourth current and output a fourth charging voltage.

2. The touch driving circuit according to claim 1, wherein the first charging voltage, the second charging voltage, the third charging voltage and the fourth charging voltage have different voltage levels.

3. The touch driving circuit according to claim 1, wherein the plurality of digital to analog converters comprises:

a first digital to analog converter, coupled to the first regulator and a ground voltage, and configured to output a first driving voltage by converting the first charging voltage or the ground voltage;

a second digital to analog converter, coupled to the second regulator and the third regulator, and configured to output a second driving voltage by converting the second charging voltage or the third charging voltage; and a third digital to analog converter, coupled to the fourth regulator and the ground voltage, and configured to output a third driving voltage by converting the fourth charging voltage or the ground voltage.

4. The touch driving circuit according to claim 3, wherein the switch circuit comprises:

a first switch, coupled between the first digital to analog converter and the touch panel;

a second switch, coupled between the second digital to analog converter and the touch panel; and a third switch, coupled between the third digital to analog converter and the touch panel.

5. The touch driving circuit according to claim 4, wherein the switch circuit further comprises:

a fourth switch, coupled between the first digital to analog converter and the second regulator; and a fifth switch, coupled between the third digital to analog converter and the fourth regulator.

6. The touch driving circuit according to claim 5, further comprising:

another plurality of digital to analog converters, coupled to the plurality of regulators, and configured to output another plurality of driving voltages according to the plurality of charging voltages, another switch circuit, coupled to the another plurality of digital to analog converters and the touch panel, and configured to output the another plurality of driving voltages in a time-sharing manner to form another driving signal for the touch panel.

7. The touch driving circuit according to claim 6, wherein the driving signal and the another driving signal have different frequencies.

8. The touch driving circuit according to claim 6, wherein the driving signal and the another driving signal have different phases.

9. The touch driving circuit according to claim 6, wherein the another plurality of digital to analog converters further comprises:

a fourth digital to analog converter, coupled to the first regulator and the ground voltage, and configured to output another first driving voltage by converting the first charging voltage or the ground voltage;

a fifth digital to analog converter, coupled to the second regulator and the third regulator, and configured to output another second driving voltage by converting the second charging voltage and the third charging voltage; and a sixth digital to analog converter, coupled to the fourth regulator and the ground voltage, and configured to output another third driving voltage by converting the fourth charging voltage or the ground voltage.

10. The touch driving circuit according to claim 9, wherein one of the first driving voltage, the second driving voltage and the third driving voltage is stored in a capacitor coupled to one of the plurality of regulators, and one of the another first driving voltage, the another second driving voltage and the another third driving voltage are provided by the capacitor.

11. The touch driving circuit according to claim 9, wherein the another switch circuit comprises:

a sixth switch, coupled between the fourth digital to analog converter and the touch panel;

a seventh switch, coupled between the fifth digital to analog converter and the touch panel; and an eighth switch, coupled between the sixth digital to analog converter and the touch panel.

12. The touch driving circuit according to claim 11, wherein the another switch circuit further comprises:

a ninth switch, coupled between the fourth digital to analog converter and the second regulator; and a tenth switch, coupled between the sixth digital to analog converter and the fourth regulator.

13. The touch driving circuit according to claim 5, wherein the plurality of regulators comprises:

a fifth regulator, coupled to the charge pump, and configured to receive a fifth current and output a fifth charging voltage; and a sixth regulator, coupled to the charge pump, and configured to receive a sixth current and output a sixth charging voltage.

14. The touch driving circuit according to claim 13, wherein the first digital to analog converter is further coupled to the fifth regulator, and configured to output the first driving voltage by converting the first charging voltage, the fifth charging voltage or the ground voltage.

15. The touch driving circuit according to claim 13, wherein the third digital to analog converter is further coupled to the sixth regulator, and configured to output the third driving voltage by converting the fourth charging voltage, the sixth charging voltage or the ground voltage.

16. The touch driving circuit according to claim 1, wherein the plurality of regulators are a plurality of low dropout regulators.

* * * * *